(12) United States Patent
Schindler et al.

(10) Patent No.: US 10,447,675 B2
(45) Date of Patent: Oct. 15, 2019

(54) METHOD FOR DELIVERING PRIMARY INFORMATION THAT EXISTS IN AT LEAST ONE ELECTRONIC FORM

(75) Inventors: Sigram Schindler, Berlin (DE); Juergen Schulze, Berlin (DE)

(73) Assignee: Sigram Schindler Beteiligungsgesellschaft MbH, Berlin (DE)

( * ) Notice: Subject to any disclaimer, the term of this patent is extended or adjusted under 35 U.S.C. 154(b) by 0 days.

(21) Appl. No.: 12/515,731

(22) PCT Filed: Nov. 30, 2007

(86) PCT No.: PCT/DE2007/002166
§ 371 (c)(1),
(2), (4) Date: May 20, 2009

(87) PCT Pub. No.: WO2008/064668
PCT Pub. Date: Jun. 5, 2008

(65) Prior Publication Data
US 2010/0057868 A1 Mar. 4, 2010

Related U.S. Application Data

(60) Provisional application No. 60/867,921, filed on Nov. 30, 2006.

(30) Foreign Application Priority Data

Nov. 30, 2006 (DE) .................. 10 2006 057 120

(51) Int. Cl.
*H04L 29/06* (2006.01)
*G06F 21/16* (2013.01)
*H04M 3/42* (2006.01)

(52) U.S. Cl.
CPC .............. *H04L 63/08* (2013.01); *G06F 21/16* (2013.01); *H04L 63/12* (2013.01); *H04M 3/42221* (2013.01); *H04M 2203/60* (2013.01)

(58) Field of Classification Search
CPC .......... H04M 3/42221; H04M 2203/60; H04L 63/12; H04L 63/08
(Continued)

(56) References Cited

U.S. PATENT DOCUMENTS 4,633,499 A * 12/1986 Nishioka ................. G10L 25/87
704/253
5,661,291 A 8/1997 Ahearn et al.
(Continued)

FOREIGN PATENT DOCUMENTS

DE    100 61 984 A1    6/2002
DE    10 2005 001351 A1    7/2006
(Continued)

*Primary Examiner* — John M Macilwinen
(74) *Attorney, Agent, or Firm* — Vorys, Sater, Seymour and Pease LLP; Vincent M DeLuca

(57) ABSTRACT

A method for delivering primary information that exists in at least one electronic form, includes transmission of the primary information via at least one communication network to at least one communication system allocated to an addressee of the primary information; creation of verification information relating to the acknowledgement of the primary information by the addressee; and saving and/or transmission of the verification information via at least one communication network. Individualized data is thus made available which not only documents the receipt of the primary information by the addressee but also the acknowledgement of the receipt of the primary information by the addressee. A telecommunication arrangement and a telecommunication unit which are suitable for carrying out the method are also disclosed.

26 Claims, 5 Drawing Sheets

(58) Field of Classification Search
USPC .......................................................... 709/206
See application file for complete search history.

(56) References Cited

U.S. PATENT DOCUMENTS

| | | | |
|---|---|---|---|
| 5,815,555 A | 9/1998 | Cairo | |
| 5,956,154 A | 9/1999 | Cairo | |
| 6,571,334 B1 | 5/2003 | Feldbau et al. | |
| 6,600,814 B1* | 7/2003 | Carter et al. | 379/88.16 |
| 6,661,879 B1* | 12/2003 | Schwartz et al. | 379/88.25 |
| 2002/0067810 A1* | 6/2002 | Barak | H04M 1/656 |
| | | | 379/88.25 |
| 2002/0144154 A1 | 10/2002 | Tomkow | |
| 2003/0088693 A1* | 5/2003 | Cheung et al. | 709/238 |
| 2003/0172120 A1 | 9/2003 | Tomkow et al. | |
| 2004/0008830 A1* | 1/2004 | Okamura | 379/93.24 |
| 2004/0083259 A1* | 4/2004 | Tenembaum | 709/201 |
| 2004/0148356 A1* | 7/2004 | Bishop et al. | 709/206 |
| 2004/0230657 A1 | 11/2004 | Tomkow | |
| 2005/0021963 A1 | 1/2005 | Tomkow | |
| 2005/0034151 A1* | 2/2005 | Abramson | 725/32 |
| 2005/0108124 A1 | 5/2005 | Colleran et al. | |
| 2005/0246541 A1 | 11/2005 | Ginter et al. | |
| 2006/0112165 A9 | 5/2006 | Tomkow et al. | |
| 2007/0116237 A1* | 5/2007 | Katkam | H04L 29/06027 |
| | | | 379/265.01 |
| 2007/0274293 A1* | 11/2007 | Forbes | H04L 63/08 |
| | | | 370/352 |
| 2008/0281928 A1 | 11/2008 | Paetsch et al. | |

FOREIGN PATENT DOCUMENTS

| | | | |
|---|---|---|---|
| EP | 0 675 625 A1 * | 4/1995 | H04M 3/42 |
| EP | 1130893 A2 | 9/2001 | |
| EP | 1337118 A2 | 8/2003 | |
| EP | 1320965 B1 | 2/2005 | |
| EP | 1519287 A1 | 3/2005 | |
| GB | 2382494 A | 5/2003 | |
| WO | 01/10090 A1 | 2/2001 | |
| WO | 01/90904 A1 | 11/2001 | |
| WO | 03/073711 A2 | 9/2003 | |

* cited by examiner

METHOD FOR DELIVERING PRIMARY INFORMATION THAT EXISTS IN AT LEAST ONE ELECTRONIC FORM

CROSS-REFERENCE TO RELATED APPLICATIONS

This application is a National Stage entry under 35 U.S.C. § 371 of International Application No. PCT/DE2007/002166 filed Nov. 30, 2007, which claims priority from German Patent Application No. 10 2006 057 120.7 filed Nov. 30, 2006 and U.S. Provisional Application Serial No. 60/867,921 filed Nov. 30, 2006, which applications are incorporated herein by reference.

BACKGROUND OF THE INVENTION

The invention relates to a method for delivering primary information that exists in at least one electronic form as well as a telecommunication arrangement and a telecommunication device that are adapted for conducting the method or for use with the method. Particularly, the invention relates to a method of delivering a primary information that allows for, beyond the fact of reading the transmitted primary information, detecting and saving the acknowledgement of the primary information by the addressee.

The proof that a certain information has been delivered to a certain information recipient can be of great importance with respect to legal or factual reasons. Concerning non-electronic transmission of information via postal delivery, it is possible to conduct such a proof for instance by transmission of a registered letter with return receipt, wherein with respect to this manner of posting the addresser receives back a notice of receipt, the return receipt, having the original signature of the recipient. Also a delivery by a bailiff is possible in some legal systems.

These well-tried methods of proving a delivery are not available with respect to electronic transmission of information, for instance via e-mail. Known e-mail programs are arranged for providing a confirmation of transmission. In such a case the addresser is informed by means of a confirmation of transmission that the transmitted e-mail message was delivered to the mailbox of the recipient. Further, a read confirmation can be requested which informs the addresser that a transmitted message was retrieved from the mailbox of the recipient and opened.

A proof of delivery of an electronic message is however not possible with such a transmission or read confirmation. This is the case due to several reasons. A first reason consists in that a read confirmation only documents that a certain message was read. The content of the message that was read is not documented. For this reason, it cannot be excluded that the originally transmitted message was delivered to the recipient in manipulated form or was only partly delivered to the recipient.

A second problem consists in that the telecommunication system of the addressee is possibly configured in such way that sending a transmission confirmation or read confirmation is denied. A "non-cooperative" addressee may therefore from his own power prevent the confirmation of receipt of the message.

A third and essential problem consists in that a read confirmation merely documents that a message was read, however allows no conclusion by whom it was read. Particularly, no conclusion is possible whether the information was noticed by the addressee, i.e., was understood semantically. As an addressee an entity is understood, that shall, according to the will of the addresser, notice and semantically understand the message, thus usually a human recipient.

Accordingly, there exists the need to provide a method for delivering primary information that exists in at least one electronic form and respective telecommunication devices that reduce the possibilities of an addressee to deny the fact of delivery of the primary information, and, in the best case, allow for the proof of the delivery to the addressee.

SUMMARY OF THE INVENTION

According to an aspect of the invention, there is provided a method comprising: transmission of the primary information via at least one communication network to at least one communication system allocated to an addressee of the primary information, creation of verification information relating to the acknowledgement of the primary information by the addressee and saving and/or transmission of said verification information via at least one communication network.

According to another aspect on the invention, there is provided a telecommunication arrangement comprising: at least one communication network, at least a first communication system that is allocated to an addresser of a primary information, at least a second communication system that is allocated to an addressee of a primary information, means for transmission of a primary information from the at least one first communication system via the at least one communication network to the at least one second communication system, means for creation of verification information relating to the acknowledgement of the primary information at the addressee, and means for saving and/or transmission of this verification information via the at least one communication network.

According to still another aspect of the invention, there is provided a telecommunication device comprising: means for creation of verification information relating to the acknowledgement of a primary information by an addressee, wherein said primary information is transmitted to a communication system that is allocated to said addressee.

Accordingly, in one embodiment of the present invention it is provided that verification information regarding the acknowledgement of primary information at the addressee is created and that this verification information is saved. The saving of the information can take place at a communication end system allocated to the addressee. Usually, the verification information is however created at a third person and/or is transmitted to such a third person via at least one communication network, wherein this third person is for instance the addresser, a trustworthy third party, or an automat, that is arranged at or in a communication network and evaluates and/or saves verification information regarding the acknowledgement of primary information at the addressee.

Therefore, in one aspect, the invention provides individualized data, that documents, beyond the fact of receipt of the primary information at the communication system of the addressee, the acknowledgment of the primary information by the addressee. In this sense, the invention provides in one aspect an individualized automatic read confirmation that documents the acknowledgement of the primary information by the addressee.

Further, it is noted, that the present invention does not demand the aware, active assistance of the addressee of the information that is to be transmitted, although such an assistance is absolutely possible in aspects of the invention.

As far as an active aware assistance of the addressee when creating a verification information is not necessary, this is connected with the advantage that the addressee cannot baffle a delivery or is hindered from baffling the delivery. The verification information restrict or prevent the possibility of the addressee to deny a delivery that has taken place. In this sense the present invention provides restrictions of deniability that may have different validity, which can also be denoted as non-deniability levels.

Thus, the invention envisages that not merely the fact is automatically detected that a transmitted primary information was received and read at the communication end system of the addressee. The verification information relates to information for delivery and acknowledgement of the primary information at the addressee himself.

For this, in one embodiment of the invention, it is provided that the creation of verification information comprises a direct or indirect interaction with the recipient of the information, to whom this information is dedicated, i.e., the addressee. At the same time, in an embodiment of the invention, the interaction with the addressee is related to the creation of verification information in a manner that is not directly recognizable by the addressee. The direct or indirect interaction with the addressee can take place upon and/or after receipt of the primary information at the communication system of the addressee.

Examples of such a direct or indirect interaction are a telephone call with the addressee that relates to contents of the transmitted message, as well as a saving of data of this telephone call or of data that can be deduced from the telephone call. An example for such deducible information is for instance the recording of a frequency spectrum of the voice signal of the addressee. The frequency spectrum, recorded at a certain time and with reference to a certain telephone number, can provide evidence that a certain person was at a certain place at a certain time. In conjunction with further information such as a read confirmation this can represent a criterion that at least limits the deniability of a delivery by the addressee (also denoted as restriction of deniability in the following).

A further example of an interaction with the addressee from which verification information can be deduced, is the transmission of an e-mail to the addressee that indirectly relates to the primary information. For instance, the primary information is delivered as voice message and the addressee simultaneously or shortly thereafter receives an e-mail that relates to the delivered voice message. An answer to the e-mail by the addressee can represent a verification information regarding the delivery of the voice message.

In a further embodiment of the invention the verification information for delivery of the primary information to the addressee is obtained by an intelligent evaluation of protocol information. Protocol information particularly includes all signalling information for connection establishment between the addresser and the telecommunication system of the addressee. Such protocol information can be recorded and the corresponding protocol steps can be stored.

Also the case that the addressee transmits authentication information to the addresser falls under the creation of verification information by an intelligent evaluation of protocol information. For instance, this can take place by means of an electronic signature. For instance, such an electronic signature can be added to a read confirmation. Such an authentication requires the aware assistance of the addressee when confirming delivery of the primary information. This is a case which is not excluded by the invention. Actually, in most cases, the addressees of the transmitted primary information will be willing to confirm the fact of receipt.

In a further embodiment of the invention the verification information for delivery of the primary information to the addressee is determined by the transmission of a computer program or a cookie to the addressee's communication device, wherein the cookie is designed such that it detects a reading of the received information by the addressee and saves this verification information and/or sends it to the addresser of the information or to a third person.

In a further aspect of the invention it can be provided that a support for the method of delivery from the communication network side is largely abdicable.

In an embodiment of the invention it is provided that the primary information experiences a transformation before or upon receipt at the communication system into another medium. For instance, the primary information is at first transmitted as an electronic mail that is transformed into a voice signal before or upon delivery. This can for instance be carried out by means of a voice generator. It can also be provided that voice information having instructions on how the receipt of the voice signal is to be confirmed are added to the voice signal or that the voice signal already contains such information.

With respect to the used terminology the following is pointed out.

A primary information can be or contain text and graphics in the form of a scripture or any other form, audio and/or video messages of any kind and form, any hybrid form of the aforementioned forms and further—not restricted to human perceivable—types of contents and forms, identifications, designations, notations, and specifications of the messages. It can also be a message transmission information such as for instance protocol-/signalling information of all kind.

A delivery of a primary information takes place in a framework of an act of communication. This act can for instance comprise an electronic mail message (e-mail) but also any other kind of electronic data transfer such as for instance via telephone, via fax machine, via SMS etc.

A telecommunication network can be a communication network, for instance the conventional telephone network, the internet, mobile communication networks, next generation networks, etc. As a telecommunication network also a communication network is understood that is arbitrarily complemented by means of conventional transportation routes of any kind of conventional transport networks (such as for instance Deutsche Post, FedEx, DHL), either delivery-initial, in centre, as well as delivery-terminal.

An addressee in the sense of the present invention is the recipient of the primary information, to whom this primary information is dedicated to. Usually, this will be a human being. The communication system is to be distinguished from the addressee, usually a communication end system that is allocated to the addressee and in which the primary information is electronically received. Further, the recipient of a transmitted primary information is to be separated from the addressee. The recipient is the operating person/the user of the communication system that is allocated to the addressee. At the same time the recipient can be identical to the addressee. The operating person/the user of the communication system can however also be different from the addressee. For instance, it can be a secretary or a family member of the addressee.

As will be recognized by the above descriptions, embodiments of the invention leverage on the acknowledgement of the primary information by the addressee or recipient of the primary information. As disclosed above, the frequency spectrum of the voice signals of the addressee will be referred to as "biosignal" authentication. Similarly, as disclosed above, the protocol or log-in monitoring of the communication system as performed by a cookie, will be referred to as "IT security" ("ITsec") authentication.

In an embodiment of the invention the addressee does not need to be known upon sending out the primary information, for instance in the sense that several addressees may come into consideration for acknowledgement. For instance, in case a company or a group of potential addressees is delivered to, several addressees come into consideration. Then, it may be documented which addressee has acknowledged the primary information.

DESCRIPTION OF EMBODIMENTS OF THE INVENTION

In the following, the invention is described on the basis of several embodiments with reference to the Figures.

Figure 1:
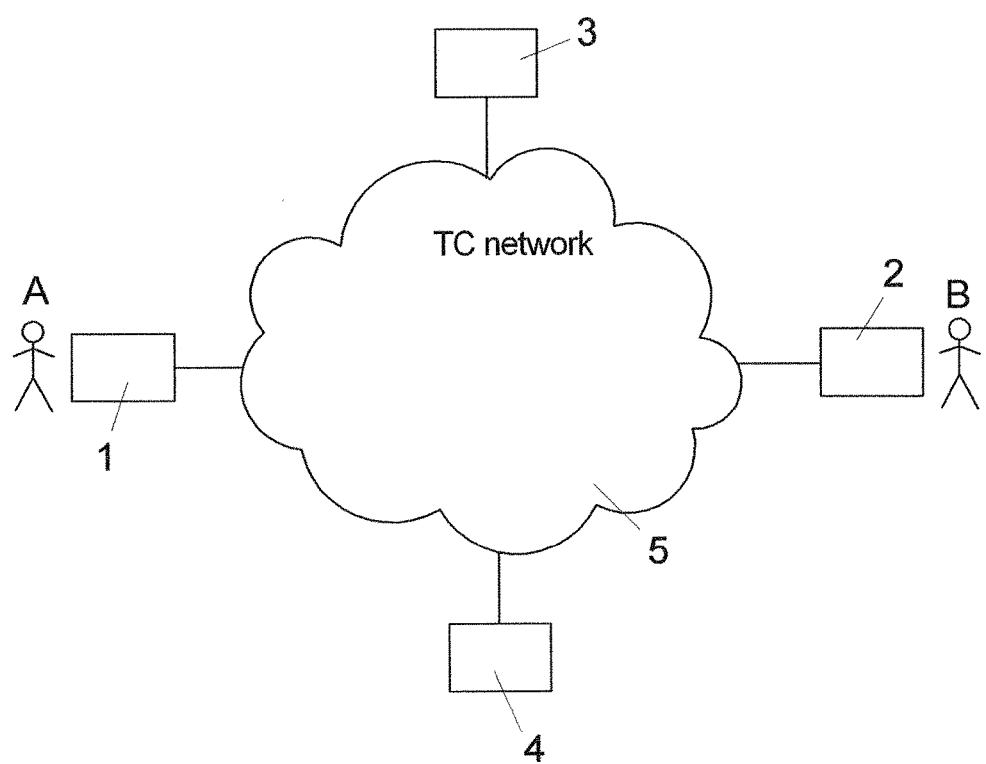
FIG. 1 shows a telecommunication network and communication systems connected thereto which are allocated to an addresser and an addressee among which a primary information shall be transmitted.

FIG. 1 schematically shows a telecommunication arrangement having a telecommunications network 5, to which two telecommunication end systems (TC end systems) are connected. To each TC end system 1, 2 a human user A, B is associated. The TC end system 1, 2 can be a single telecommunication end device such as a PC, a laptop, a telephone (including a cell phone) or a PDA. Likewise, the end system 1, 2 can be a local system consisting of several components such as for instance a telephone, a PC, a laptop, a fax machine, a TC system and a server.

In the following it is assumed that the addresser A sends a certain Information (primary information) to the addressee B by means of the TC end system 1 via the TC network 5 to the TC end system 2 for acknowledgement and information detection.

Furthermore, an intermediate addressee 3 as well as an interaction automat 4 are connected to the TC network 5. Both devices 3, 4 are optional and only present in embodiments of the Invention.

The intermediate addressee 3 can be for instance a trustworthy third person, for instance a notary, to whom the primary information is sent at first from the TC end system 1. From the intermediate addressee 3 the information is then redirected to the TC end system 2. Protocol- or as the case may be signalling information, which are transmitted for transmission of the primary information among the involved units, are at the same time on one hand transmitted among the TC end system 1 and the intermediate addressee 3 and on the other hand among the intermediate addressee 3 and the TC end system 2.

The intermediate addressee 3 can be a trustworthy third party, which both of the other parties A, B trust (so called Trusted Third Party, TTP). Such TTPs usually collect proofs concerning transactions, store them, and make them available in case of need. Their activity can comprise a key- and identity certification. The intermediate third person 3 must not necessarily represent such a trustworthy third party, but may also have a grade of trust lying beneath the latter, or may even comprise no grade of trust at all.

In a further embodiment it may be provided that the intermediate addressee 3 merely obtains a copy of the primary information that was transmitted from addresser A to addressee B, wherein the actual communication exclusively takes place among addresser A and addressee B or, as the case may be, among the TC systems 1, 2 allocated to them, respectively. The transmission of a copy of the transmitted information to the intermediate system 3 then serves for confirming the attempt of a delivery to the addressee B.

It is noted, that the intermediate addressee must not be known upon sending the primary information, but the intermediate addressee is however determinable for instance by means of certain attributes, he should comprise.

In FIG. 1 the intermediate addressee 3 is depicted as being connected to the TC network 5. Alternatively, the intermediate addressee can be arranged in the network. Likewise, it can be a unit of the end system 1, 2 of the addresser A or the addressee B.

The interaction automat 4 being optional as well may also serve for, in an automated manner, providing a direct or indirect interaction with the addressee B (and not only with the corresponding TC end system 2), and saving the corresponding verification information, and, as the case may be, for transmission of said verification information to further TC devices. This will be further explained in detail by means of embodiments. At the same time, the interaction automat 4 can be part of an intermediate addressee 3. It is also possible that the interaction automat 4 merely obtains a copy of the primary information that was sent from the addresser A to the addressee B, and, on the basis of this information and eventual additional instructions of the addresser A, conducts and logs an interaction with the addressee B.

Figure 2:
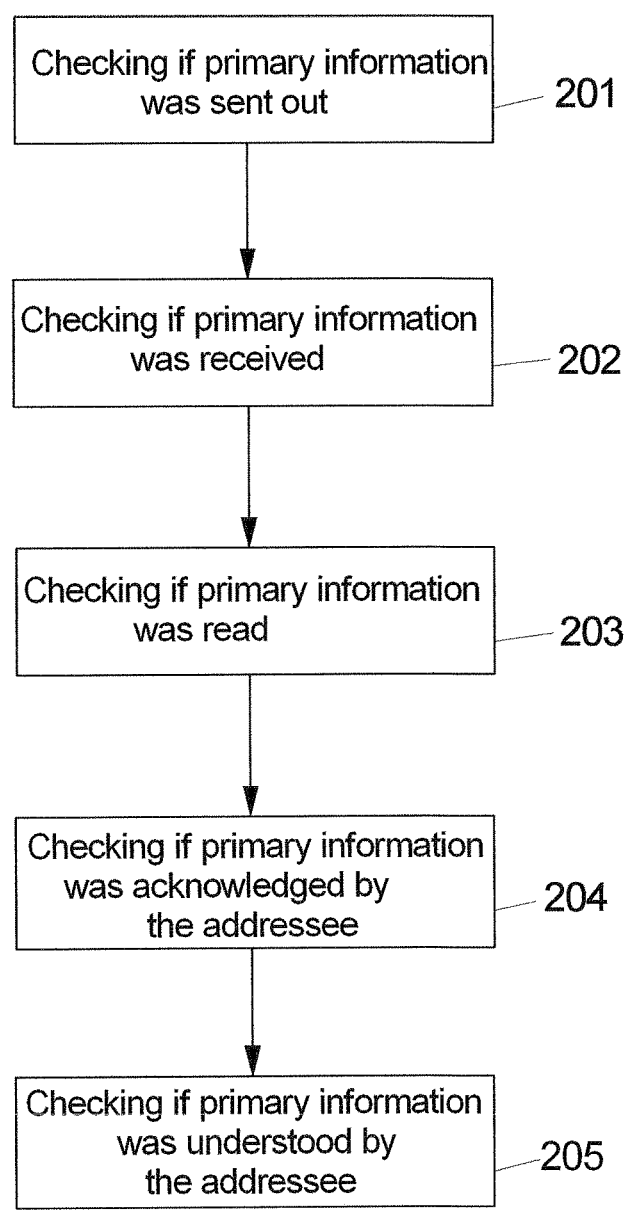
FIG. 2 shows verification levels regarding the confirmation of the delivery of a primary information to an addressee.

FIG. 2 shows different verification levels, that may principally be fulfilled regarding the delivery of a primary information to an addressee. A first verification level 201 relates to checking whether the primary information was sent from the addresser. Such a check takes place at the addresser or, as the case may be, at the addresser's end system 1. A second verification level 202 relates to checking and determining whether the primary information was received at the TC end system 2 of the addressee. For instance, a transmission confirmation as known from e-mail programs corresponds to such a verification level. For instance, a transmission confirmation as known from e-mail programs corresponds to such a verification level.

A third verification level 203 relates to checking, or as the case may be, to determining whether the primary information was read at the TC end system 2 of the addressee B. A read confirmation as known from e-mail programs corresponds to such a verification level. A fourth verification level 204 relates to checking, or as the case may be, determining whether a primary information was acknowledged by the addressee. Only this verification level 204 allows for confirming or ideally proving in a judicial sense a delivery of the primary information to the addressee.

Finally, a fifth verification level 205 relates to checking and determining whether the addressee comprehends the primary information, thus, has read and/or heard and/or seen and semantically understood it. This final verification level 205 is normally not necessary for conducting the proof of a delivery to the addressee. Even in a common postal delivery one can only extract the information from a confirmation of receipt that the addressee has received the transmission. Whether he has read it, is associated to the subjective sphere and can normally not be determined. However, the method according to the invention partly also allows for a verification according to verification level 5.

Figure 3:
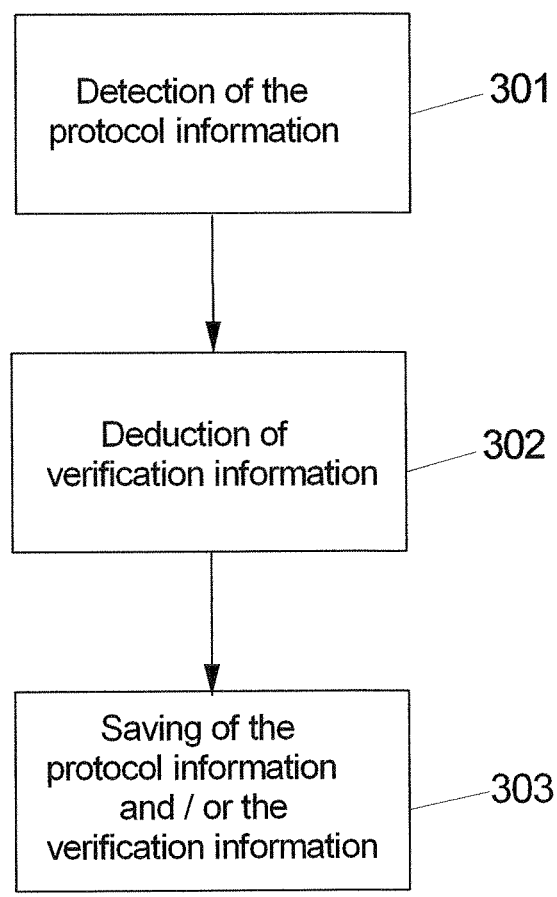
FIG. 3 shows an embodiment for creation of verification information relating to the delivery of a primary information to an addressee.

FIG. 3 relates to steps of the method for detecting and deducing verification information regarding the acknowledgement of a primary information at the addressee B, and not only at his TC end system 2. It is provided that all protocol information, that is transmitted among the involved TC end systems 1, 2 within the framework of the transmission of the primary information, is detected, documented, and saved, step 301.

In step 302 it is tried to deduce from this information verification information of said kind. This can take place via an intelligent software that evaluates the protocol information. It can be provided for instance, that the addresser, wherein in this case the active assistance of the addresser regarding the creation of verification information is necessary, confirms receipt of the primary information by means of a digital signature or another authentication.

The protocol information and/or verification information, for example both of them, are then saved in step 303, wherein said saving of the information may take place at the end system 1 of the addresser, which however may generally also take place at another place, for instance at the end system 2 of the addressee, at an intermediate addressee 3 and/or an interaction automat 4.

Figure 4:
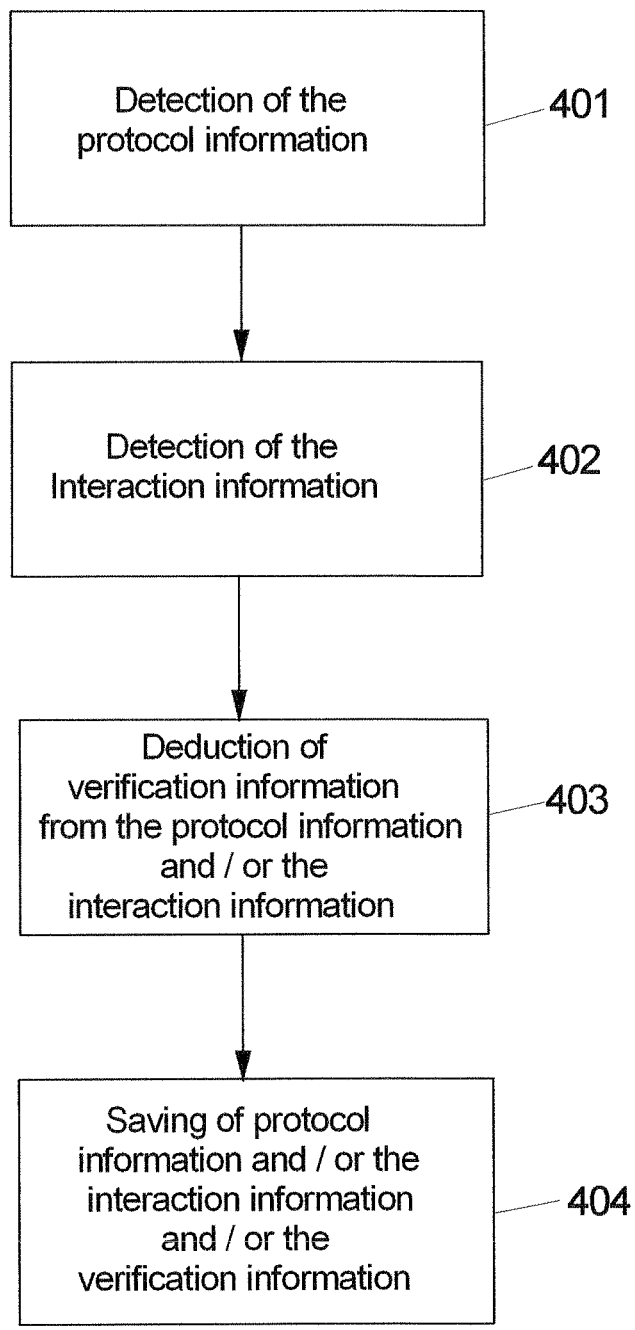
FIG. 4 shows a further embodiment for the creation of verification information relating to the delivery of a primary information to an addressee.

FIG. 4 shows a further embodiment that, besides detection 401 of protocol information according to FIG. 3, also allows for a detection of interaction information in step 402 in addition. This interaction information relates to information that was created by means of a direct or indirect interaction with the addressee B, either upon receipt of the information at the addressee or in a communication act following thereafter. This will be further explained by means of embodiments.

Then, in step 403 a verification information is deduced from the interaction information and/or the protocol information. Thereby, protocol information may also serve for supporting the evaluation of the interaction information. It can be provided as well that only interaction information is detected and evaluated. An evaluation of interaction information and/or protocol information allows for providing a verification information of at least verification level 4 according to FIG. 2. Then, in step 404, protocol information and/or interaction information and/or verification information are saved, wherein said saving, as explained with reference to FIG. 3, may take place at the addresser or at other data devices.

Figure 5:
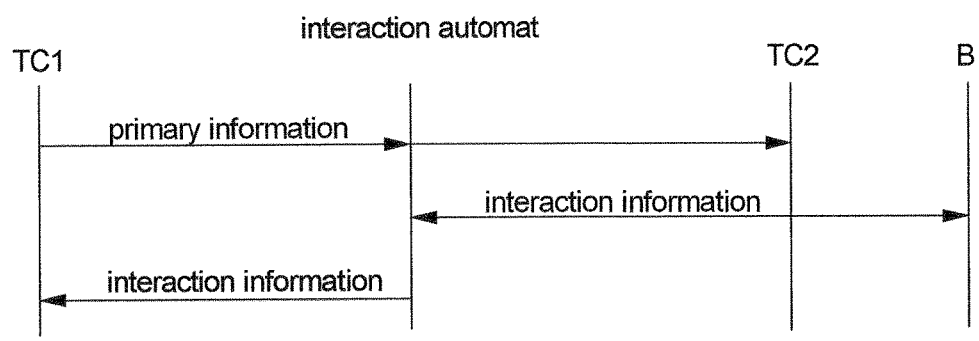
FIG. 5 shows a communication sequence for delivery of primary information and for creation of verification information for the acknowledgment of this primary information by the addressee.

FIG. 5 shows a communication sequence among the TC device 1 allocated to the addresser A, the TC device 2 allocated to the addressee B, an interaction automat (for instance corresponding to the interaction automat 4 of FIG. 1) and the addressee B.

At first, the primary information is sent from the TC end system 1 to the interaction automat 4, and from the interaction automat 4 it is further transmitted to the TC end system 2. At the same time, the interaction automat 4 acts as an intermediate addressee. In another embodiment it is however also possible that the transmission of the primary information from the TC end system 1 to the TC end system 2 takes place directly, i.e., without involving the interaction automat 4, wherein in this case, the interaction automat 4 may receive a copy of the transmitted information.

It is pointed out, that the primary information may undergo a media conversion at the interaction automat or elsewhere. For instance, the primary information is contained in one and is transformed in the interaction automat into a voice message by means of a voice generator which is then delivered via the telephone network.

Within the framework of transmission of the primary information, the addresser A may receive verification information of verification level 1 to 3 according to FIG. 2, i.e., he may particularly gain assurance that the information was sent, received at the recipient and read thereabouts. Further information is not accessible.

Now, the interaction automat 4 initiates, for instance within the framework of an own communication connection, an interaction with the party B. This interaction may take place via the TC end system 2, but may also take place via different technical devices, for instance a cell phone of the addressee B.

A first example for such a further communication, that serves for obtaining interaction information from which verification information of verification level 4 and eventually also of level 5 can be deduced according to FIG. 2, is to make a telephone call with addressee B. The telephone call may for instance relate to the content of the primary information transmitted before. At the same time, the content of the telephone call with the addressee B and thus the response of the addressee B is saved in an embodiment. For instance, a response of the addressee is conceivable in the sense that he confirms that he has received the e-mail. It is further conceivable that the addressee B—possibly in emotional imprudence—goes into the content of the transmitted primary information in the telephone call. Such information clearly documents the acknowledgement of the primary information as well as the semantic comprehension of the primary information at the addressee B.

Inasmuch certain legal systems consider it as illegal to record telephone calls without agreement of the interlocutor, it can be provided that, instead of the telephone call, information is recorded that can be deduced from the telephone call. In an embodiment this may be a deduced information from which at least a subset of the content of the telephone call and/or the identity of the interlocutor can be deduced without being identical to the telephone call or to make the latter reconstructible. It can be provided for instance that regarding the spoken statements of the addressee a spectral analysis information is recorded as a deduced information.

It is pointed out, that the interaction automat can be equipped with an intelligent voice system so that the interaction automat may autonomously conduct a telephone call with the addressee B. In other embodiments a human party is associated to the interaction automat, that conducts the telephone call. It can also be provided that the interaction automat is arranged at the addresser A, wherein the addresser A conducts the telephone call with the addressee.

A further example for the generation of interaction information is the transmission of a further e-mail to the addressee, or as the case may be, to the addressee's TC end system 2. This e-mail may also indirectly relate to the primary information transmitted before. The response to this e-mail may represent an interaction information from which verification information can be deduced. In case the addressee responds for instance to the e-mail to that effect that he has not read the first e-mail, it can be at least deduced therefrom that the addressee has acknowledged the first e-mail.

It is also possible that within the framework of a second e-mail or another electronic message or as well upon transmission of the primary information, a cookie is installed onto the TC end system of the addressee B. This cookie may be designed for instance in a way that it documents the opening of the transmitted primary information, including detection of log-in-Information or another authentication information of the user. Usually, a user of a PC or a laptop has to identify himself at the beginning of the usage by means of a log-in that serves for authentication, so that in this way an identification of the user and thus cognition of the addressee is possible. Also other information may be saved by the cookie, and may be read out at a given time. At the same time, the information may be at first saved at the addressee and his end system or may be transmitted at once to the addresser or another end system.

The realization of the invention is not limited to the above stated embodiments. For instance it can be provided that
- the interaction automat comprises human interaction and/or a photo sequence on the route of delivery,
- denial of acceptance confirmations are saved and evaluated,
- a conversion of the representation of the primary information does not only include message content related "media conversion", but also "delivery-address/-mode"-conversion (for example language or judicial preamble or reassurance of the grade of authorization of the recipient), or as well "non-repudiability"-conversion of different variants, also in favor of a third person,
- created verification information is, as an evidence for delivery, retrievable at any time, online controllable, online traceable, interactive, alarm activating, approvable, authenticatable, and/or accessible to different media conversion,
- all information can be transmitted in an encrypted manner, so that it can only be understood partly or in its entirety, and as the case may be, with a key agreement only during delivery, by the addresser or only by him and the addressee or only by him and other specified groups of persons,
- the messages may contain non-deniable addresser legitimation/identity and/or content authenticity and/or addressee identity, wherein this kind of non-deniability may stem from a notary that was mandated by the addresser,
- also announced and/or unexpected and/or aware methods as well as methods recording unilateral/bilateral spoken statements, wherein the latter, as the case may be, send out or disguisedly request at least one "spectral analysis information", may belong to the levels of non-deniability,
- possibilities of participation of an involved network, particularly the network that schedules the delivery, exist,
- an interaction with Kreditreform/Schufa etc., collection companies, credit card companies etc. exist,
- verification information concerning a lawyer or a notary or an encryption-"trusted entitity"—beneath the known "trusted third party"—is detected and/or saved,
- a self-documention takes place, and/or
- an "indirect delivery" takes place, which my be, for instance, content based,
- protocol information is "tape-recorded" during delivery of the primary information (as the case may be on different protocol levels), or as the case may be, at least the protocol steps taking place on the addresser side are saved,
- the result of the delivery of a primary information is signalled by the application system (end system of the addressee) and at least the logging of the application system is for instance saved in the end system of the addresser,
- protocol information during delivery of the primary information (as the case may be on different protocol levels) from the addresser to an intermediate addressee are "tape-recorded" or at least the protocol steps taking place on the addresser side are saved, and
- protocol information during delivery of the primary information (as the case may be on different protocol levels) from an intermediate addressee to the end addressee are "tape-recorded" or at least the protocol steps taking place on the side of the intermediate addressee are saved and/or transmitted to the addresser.

The invention claimed is:

1. A method for verifying delivery from an addressor to a recipient of primary information that exists in at least one electronic form, comprising:
   transmitting the primary information via a first framework of communication connection, from at least one communication system allocated to the addressor to at least one communication end system allocated to said recipient of the primary information,
   generating verification information comprising five verification levels, whereby generating said verification levels comprises:
   via the first framework of communication connection, generating a first level of verification information confirming that the primary information was sent from the at least one communication system allocated to the addressor;
   via the first framework of communication connection, generating a second level of verification information by checking and determining whether the primary information was received at the at least one communication end system allocated to the recipient;
   via the first framework of communication connection, generating a third level of verification information by checking and determining whether the primary information was read at the at least one communication end system allocated to the recipient, wherein the third level of verification information is created by transmitting a computer program to the communication end system allocated to the recipient, and wherein the computer program detects a reading of the received information by the recipient;
   initiating an interaction with the recipient via a second framework of communication connection, generating a fourth level of verification information by checking and determining whether the primary information was acknowledged by the recipient; and
   via the second framework of communication connection, deducing a fifth level of verification information by checking and determining whether the primary information was semantically understood by the recipient; and
   causing said verification information comprising the five verification levels to be stored via at least one telecommunication network.

2. A method as in claim 1, wherein said creation of verification information is not known to the recipient.

3. A method as in claim 1, wherein the primary information is transmitted to a computer or a telephone.

4. A method as in claim 1, wherein the primary information contains at least one item of audio.

5. A method as in claim 1, wherein said interaction comprises a voice communication which relates to the primary information.

6. A method as in claim 1, wherein the primary information comprises data which indicates the identity of the sender of the primary information.

7. A method as in claim 1, wherein the primary information contains data indicating its integrity.

8. A method as in claim 1, wherein said interaction is conducted automatically by an interaction automat.

9. A method as in claim 8, wherein the interaction automat recognizes information about said communication system, the recipient or said primary information and conducts said interaction so as to create verification information depending on said recognition.

10. A method as in claim 1, wherein said verification information further comprises an evaluation of protocol information relating to the transmission of the primary information.

11. A method as in claim 1, wherein the verification information is saved together with the primary information.

12. A method as in claim 1, wherein the verification information is transmitted before storing.

13. The method of claim 1, wherein said verification information is stored by a third party intermediary.

14. Apparatus for verifying delivery from an addressor to a recipient of primary information that exists in at least on electronic form, comprising:
   at least one communication network;
   a transmitter configured to transmit the primary information, via a first framework of communication connection, from at least one communication end system allocated to the addressor, to at least one communication system allocated to said recipient of the primary information; and
   a processing device including a processor configured to:
      generate verification information comprising five verification levels, whereby generating said verification levels comprises:
         via the first framework of communication connection, generate a first level of verification information confirming that the primary information was sent from the at least one communication system allocated to the addressor;
         via the first framework of communication connection, generate a second level of verification information by checking and determining whether the primary information was received at the at least one communication end system allocated to the recipient;
         via the first framework of communication connection, generate a third level of verification information by checking and determining whether the primary information was read at the at least one communication end system allocated to the recipient, wherein the third level of verification information is created by transmitting a computer program to the at least one communication end system allocated to the recipient, and wherein the computer program detects a reading of the received information by the recipient;
      initiate an interaction with the recipient via a second framework of communication connection, generating a fourth level of verification information by checking and determining whether the primary information was acknowledged by the recipient;
      via the second framework of communication connection, deduce a fifth level of verification information by checking and determining whether the primary information was semantically understood by the recipient; and
      cause said verification information comprising the five verification levels to be stored via at least one telecommunication network.

15. Apparatus as in claim 14, wherein said creation of verification information is not known to the recipient.

16. Apparatus as in claim 14, wherein the primary information is transmitted to a computer or to a telephone.

17. Apparatus as in claim 14, wherein the primary information contains at least one item of audio.

18. Apparatus as in claim 14, wherein said interaction comprises a voice communication which relates to the primary information.

19. Apparatus as in claim 14, wherein the primary information comprises data which indicates the identity of the sender of the primary information.

20. Apparatus as in claim 14, wherein the primary information contains data indicating its integrity.

21. Apparatus as in claim 14, wherein said interaction is conducted automatically by an interaction automat.

22. Apparatus as in claim 21, wherein the interaction automat recognizes information about said communication system, the recipient, or said primary information and conducts said interaction so as to create verification information depending on said recognition.

23. Apparatus as in claim 14, wherein said verification information further comprises an evaluation of protocol information relating to the transmission of the primary information.

24. Apparatus as in claim 14, wherein the verification information is saved together with the primary information.

25. Apparatus as in claim 14, wherein the verification information is transmitted before storing.

26. The apparatus of claim 14, wherein said verification information is stored by a third party intermediary.

* * * * *